United States Patent
Valta et al.

(10) Patent No.: US 8,066,903 B2
(45) Date of Patent: Nov. 29, 2011

(54) METHOD FOR PREPARING A CELLULOSE CARBAMATE SOLUTION

(75) Inventors: Kyösti Valta, Tampere (FI); Eino Sivonen, Ruutana (FI); Tero Malm, Tampere (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 129 days.

(21) Appl. No.: 12/085,436

(22) PCT Filed: Nov. 23, 2006

(86) PCT No.: PCT/FI2006/050515
§ 371 (c)(1),
(2), (4) Date: Jun. 29, 2009

(87) PCT Pub. No.: WO2007/060296
PCT Pub. Date: May 31, 2007

(65) Prior Publication Data
US 2009/0283717 A1  Nov. 19, 2009

(30) Foreign Application Priority Data

Nov. 23, 2005 (FI) .................................... 20055619

(51) Int. Cl.
| | |
|---|---|
| C09K 3/00 | (2006.01) |
| C08B 15/06 | (2006.01) |
| D21H 11/00 | (2006.01) |
| D21H 13/00 | (2006.01) |
| D01D 5/08 | (2006.01) |
| B29C 47/00 | (2006.01) |
| B29C 47/88 | (2006.01) |
| B29C 47/90 | (2006.01) |
| C08B 3/00 | (2006.01) |
| D21H 15/00 | (2006.01) |
| D21H 17/00 | (2006.01) |
| D21H 19/00 | (2006.01) |
| D21H 21/00 | (2006.01) |
| D21H 23/00 | (2006.01) |
| D21H 25/00 | (2006.01) |
| D21H 27/00 | (2006.01) |

(52) U.S. Cl. .................... 252/182.12; 536/30; 162/109; 162/164.4; 264/178 F; 264/178 R

(58) Field of Classification Search ................... 162/109, 162/164.4; 536/30; 264/178 F, 178 R; 252/182.12
See application file for complete search history.

(56) References Cited

U.S. PATENT DOCUMENTS

| | | | | |
|---|---|---|---|---|
| 2,134,825 | A | 11/1938 | Hill et al. | |
| 4,526,620 | A * | 7/1985 | Selin et al. | 106/166.43 |
| 4,530,999 | A * | 7/1985 | Selin et al. | 536/30 |
| 4,997,933 | A * | 3/1991 | Rahman | 536/30 |
| 4,997,934 | A * | 3/1991 | Rahman | 536/30 |
| 6,590,095 | B1 * | 7/2003 | Schleicher et al. | 536/30 |

FOREIGN PATENT DOCUMENTS

| | | |
|---|---|---|
| DE | 10203005 A1 * | 8/2003 |
| FI | 20020163 A1 | 7/2003 |
| FI | 112869 B | 1/2004 |
| GB | 2148789 A | 6/1985 |
| WO | WO-03/064476 A1 | 8/2003 |

OTHER PUBLICATIONS

Dow Product Information: Freezing Point Curve for Caustic Soda Solutions { http://www.dow.com/PublishedLiterature/dh_0048/0901b80380048f1a.pdf?filepath=causticsoda/pdfs/noreg/102-00417.pdf&fromPage=GetDoc} T.P. Hou Manufacture of Soda Ash 2nd et . NY Reinhold Pub. Corp 1942.*
Cryobath Neslab CB-80 instructions, CFC-Free CB-60/CB/80 Cryobath Low Temperature Bath Thermo NESLAB Manual P/N U00551 Rev Apr. 3, 2000.*
PCT/ISA/210—International Search Report—Mar. 7, 2007.

* cited by examiner

*Primary Examiner* — Ketih Walker
*Assistant Examiner* — Aaron Greso
(74) *Attorney, Agent, or Firm* — Venable LLP; Eric J. Franklin

(57) ABSTRACT

A method for preparing a cellulose carbamate solution. Dissolving is performed in two steps, first by moistening cellulose carbamate pulp with a dilute alkaline solution and second by admixing a concentrated alkaline solution, as cold as possible, to the pulp under intensive stirring. The technique utilizes the low freezing point of the aqueous NaOH solution at the concentration of 18%, wherein the freezing point is below $-20°$ C., and the intensive stirring function of the dissolve mixer device during the dosage. It is possible to prepare solutions of high quality and having high dry matter content in a mixing time of a few minutes only.

16 Claims, No Drawings

METHOD FOR PREPARING A CELLULOSE CARBAMATE SOLUTION

CROSS-REFERENCE TO RELATED APPLICATIONS

This application claims priority to Finnish patent application 20055619 filed 23 Nov. 2005 and is the national phase under 35 U.S.C. §371 of PCT/FI2006/050515 filed 23 Nov. 2006.

FIELD OF THE INVENTION

The invention relates to a method for preparing a cellulose carbamate solution, in which method cellulose carbamate powder or granulates are dissolved in two steps.

An alkaline solution of cellulose carbamate can be used in the same way as viscose cellulose, for example in the manufacture of fibers and films and in a totally novel manner, for example for reinforcing paper products, by precipitating pulp to cellulose carbamate and, if necessary, by regenerating the obtained pulp back to cellulose.

TECHNICAL BACKGROUND

The manufacture of fibers and films from cellulose by the viscose process has been known for more than a hundred years. Even today, almost all cellulose-based fibers are manufactured by the viscose method. It is a known method, by which various properties of the final product are achieved by varying the material and process parameters. However, the viscose method involves significant drawbacks: the preparation of the spinning solution includes laborious work stages, the carbon disulphide used for the dissolution is toxic, inflammable and combustible, and it is difficult to recover. Furthermore, some of the carbon disulphide is decomposed to hydrogen sulphide, which is also toxic and explosive. In addition, the viscose solution is an unstable product which cannot be stored as an intermediate product, but all the steps of the manufacture must be taken without a delay from the beginning to the end, often keeping the pulp at a low temperature.

Several attempts are known to replace the viscose method with a more ecological method. The most promising one has been the conversion of cellulose to cellulose carbamate by means of urea (see, for example, D. Klemm et al., Comprehensive Cellulose Chemistry, Wile-VCH 1998). One of the first attempts to manufacture cellulose carbamate is presented in U.S. Pat. No. 2,134,825. Finnish patents FI 112795 and FI 112869, and the corresponding international patent application WO 03/064476, disclose a novel and effective method for preparing cellulose carbamate (abbreviated CCA). In this method, the chemicals are dosed in atomized form into ground cellulose in a fluidized bed type mixer, and the homogenization of the pulp and the penetration of the chemicals into the fibers are effected by a mechanical working device, such as a sieve plate press. The final reaction takes place in an oven or the like, in which the temperature is raised above the melting point of urea, 133° C.

Cellulose carbamate is alkali soluble at a substitution degree of 0.1 to 0.3. As early as in the above-mentioned old US patent, it has been disclosed that the dissolution is advantageously made at a reduced temperature. Typically, the dissolution temperature of −5° C. has been applied. The preparation of the solution has also been discussed in U.S. Pat. No. 6,590,095. It presents a two-step dissolving technique, in which the first step is taken by using an NaOH solution that is stronger than the final solution, and in the second step, the solution is diluted with water and/or an aqueous NaOH solution. The presented dissolving technique, as all known CCA dissolving techniques, is characterized by a long mixing time (>1 hour). Furthermore, according to the patent, the preparation of the solution is independent of the DP level (degree of polymerization) of the carbamate.

SUMMARY OF THE INVENTION

It is an aim of the invention to develop a multi-step dissolving technique for CCA solution, in which the dissolving time is only a few minutes. To achieve this aim, the invention is primarily characterized in that in the first step, the cellulose carbamate is dosed into a dilute cooled alkaline solution, and in the second step, a strong alkaline solution, whose temperature is below the solution temperature of the first step, is added into the mixture under intensive stirring. In this way, the process of dissolving is accelerated, the second step taking only a few minutes, and the method yields a fiberless solution of high quality.

As for the other features and advantages of the invention, reference is made to the description hereinbelow.

DETAILED DESCRIPTION OF PREFERRED EMBODIMENTS OF THE INVENTION

The percentages presented in this context refer to the proportions calculated on the basis of the mass (weight-%), unless otherwise indicated.

The cellulose carbamate may be prepared in a way known from said document WO 03/064476. When applying this technology, the chemicals can be dosed in atomized form in an aqueous solution into finely ground cellulose or coarsely ground cellulose or, in the case of urea, also in the form of a dry powder in a fluidized bed type mixer. This is followed by mechanical working, and the reaction is completed in an oven at a temperature above the melting point of urea. The coarse grinding of the cellulose and the omission of the aqueous solution dosage of urea improve the total economy of the process.

Because the invention relates to the dissolution of cellulose carbamate obtained from the reaction between cellulose and urea, it can naturally be applied to cellulose carbamate prepared by other methods as well.

We have surprisingly found that the CCA dissolution is preferably carried out in steps according to the following principles. The maximum CCA content of the solution will depend roughly on the DP level of the CCA, as indicated in the following table:

| DP | CCA content % | NaOH concentration |
|---|---|---|
| <100 | >15 | 7 |
| 100 - | 12 | 8 |
| 150 - | 11 | 8.5 |
| 200 - | 10 | 8.5 |
| 250 - | 9 | 8.5 |
| 300 - | 8 | 8.5 |
| >350 | 7 | 8.5 |

However, the NaOH concentration is almost constant, if solutions of high quality are desired. The NaOH concentration can be reduced at very low DP levels only. At technically interesting DP levels, the NaOH concentration is 9% at the most, preferably about 8.5%.

The amounts of liquid in the solution are calculated according to the above table to correspond to the mass in question. Normally, the aim is to raise the CCA content as high as possible. Limiting factors here may include the general pumpability of the mass, filtration, the removal of air, the viscosity of the solution in the application step, or the operation of the dissolving mixer during the dissolution. The optimization is carried out case by case, taking into account these requirements.

The NaOH solution is dosed in two batches: 1) the premixing is performed with an approximately 1% NaOH solution including all the free water, and 2) the actual dissolution is performed with an 18% NaOH solution. The total NaOH content of the solutions corresponds to the value in the table above.

The dissolution is performed as follows: 1) The 1% NaOH solution for the premixing is cooled in advance down to the temperature of about 0° C. The CCA powder is admixed into the liquid to form a homogeneous mass. The temperature setting of the mixer is about 1° C., and the stirring is distributive (gentle stirring movement but so that all of the mass is in motion) and the agitator wipes the edges of the mixing vessel. The time taken by this step will only be determined by obtaining a mass that is evenly moistened and visually homogeneous. 2) In the next step, an 18% NaOH solution is dosed into the dissolving mixer. The solution has been pre-cooled down to the temperature of about −20° C. During the dosing, the mass is stirred vigorously (dispersively), and the temperature setting of the mixer is set down to the value of −6° C. As a result of the intensive stirring, the temperature of the pulp of the CCA solution begins to rise. The intensive stirring is stopped soon after finishing the dosage but at the latest when the temperature has risen to the value of about 5° C. The solution will be complete almost immediately after the dosage of the 18% NaOH solution. The completion can be seen visually as a rapid change of the solution from milky to clearly transparent (the basic colour of the solution being reddish or brownish, depending on the mass). After this, it is possible to continue the distributive stirring and to let the temperature of the mass drop to the setting temperature of the mixer. It necessary, the removal of air can also be performed in the dissolving mixer vessel, provided that it has a vacuum function.

Essential steps in the new dissolution mixing technique include 1) the moistening, activation and homogenization of the CCA mass with a dilute 1% NaOH solution before the actual dissolution, 2) the actual dissolution with a concentrated NaOH solution by cooling it down to an extremely cold temperature before the dosage. For this, the minimum freezing point of the NaOH solution, of about −30° C. at the solution concentration of 18%, and the intensive mixing of the mass in connection with the dosage of the latter alkaline solution are utilized. Consequently, an increase in the local concentration, which would result in the encapsulation of particles, is avoided.

The first step, i.e. the mixing step, is taken at a temperature below the room temperature. The temperature can be set to a value below 5° C. and preferably such that it is not more than two degrees (° C.) higher than the freezing point of the solution, taking into account the NaOH content of the solution and all the possible substances dissolved therein. The NaOH content is preferably at least 0.5%. The upper limit to the NaOH concentration is set so that even a partial dissolution of carbamate will not yet start. Consequently, the NaOH content of the solution is 4% at the most, preferably between 1 and 2%.

In the second step, i.e. the dissolution step, the temperature of the concentrated solution to be added can be set as low as possible, as long as it is above the freezing point of the solution. In practice, suitable temperatures are below −15° C., preferably between −25° C. and −15° C. The concentration of 18% is advantageous in that no freezing will take place at temperatures below −25° C. yet. In the concentration range from 15 to 22%, relatively low temperatures (−20° C. and up) can still be safely employed.

The amounts of substances in the steps are adjusted taking into account the desired final content of CCA and NaOH in relation to each other so that more water is used in the first step.

By introducing the concentrated alkaline solution at a maximally cold temperature, a temporary and/or local increase in the temperature is avoided at the critical moment of the dissolution process.

In the dissolving method, it is advantageous to use a mixer with separate functions for intensive (dispersive) and gentle (distributive) stirring. The function of the gentle stirring is to keep the mass as a whole in motion and to wipe the edges of the vessel to improve the heat transfer and to prevent freezing at the edges. It is also essential to design the mixer so that no dead points are developed in the flow (the material does not stand still, for example in recesses of the discharge openings). A number of such mixers are commercially available. An advantageous mixer is one made by Limitech, Denmark, with a jacket and two separate agitators. Corresponding devices include the German reactors of Lödige and Draiss.

The CCA material is characterized by means of the DP level, and the quality of the solution is evaluated by means of a clogging indicator Kw. In the following, we shall describe the methods for determining these.

1) The degree of polymerization (DP) provides a prediction for the mechanical and physical properties of the final product (such as fibers and films) and is used as a measure for the quality control in the process. The higher the DP level, the more dilute solutions must be used, if the viscosity sets a limit on the application. The ideal would be high cellulose content and a sufficiently low viscosity. It would be advantageous to be able to adjust the DP case by case (to optimize the product and runnability properties). Normally, in the manufacture of viscose fibers, the optimal DP ranges from 200 to 300. For determining the DP, the method according to the standard SCAN-CM 15:99 is used here. In the method, an intrinsic viscosity ratio is determined to evaluate the DP on the empirical basis (see e.g. J. Gullichsen, H. Paulapuro, Papermaking Science and Technology, Fapet 2000).

2) Clogging indicator Kw (filtration residue) represents the content of insoluble matter in the solution. This is a common measurement for the quality of a solution, and particularly a measure for the clogging tendency of a fiber nozzle. This analysis is made according to the article by H. Sihtola in Paperi ja puu 44 (1962):5, pp. 295-300. It should be noted that the result will, to some extent, depend on the filter cloth type used. The filter mentioned in the article is no longer available, but a corresponding type has been sought here. After a number of tests, we decided to use the paper-based filter type 520B made by Schleicher & Schnell. Normally, a solution with Kw<1000 is considered good in view of fiber applications.

In the following examples 1 to 8, the masses have been prepared as disclosed in Finnish patent FI 112869. In this context, the known single-step dissolution technique has been used, in which the NaOH content was 8.6%, the temperature was kept at −6° C., and the CCA content varied from 2.5 to 7%. Said patent describes how the CCA materials used for the dissolution comparison were prepared. In the preparation of a conventional solution, the dissolving time is 2 hours. In the new method, the time comparable to this, i.e. the actual dissolving step, is 2 minutes. In the two-step dissolving technique, the following conditions were applied: The batch size used was 25 kg. The dosages of the first step (in this order): water 11,230 g (T=4° C.), NaOH 18% 1,700 g (T=−18° C.), and CCA 2,100 g. Here, the NaOH content of the solution will be 2.0%. The temperature of the mixer is set at −6° C., and step 2 is dosed: NaOH 18% (T−18° C.) 9,917 g. The total NaOH concentration of the solution will be 8.4%, and the CCA content will also be 8.4%.

TABLE 1

Analysis results of example test runs.

| Test No. | Degree of Polymerization DP | Clogging indicator Kw | Quality of solution | Kw* of the two-step dissolution technique | Quality* of the two-step dissolution technique |
| --- | --- | --- | --- | --- | --- |
| 1 | 230 | 1900 | 1 | 1500 | 1 |
| 2 | 700 | 6400 | 3 | 4800 | 2 |
| 3 | 200 | 400 | 1 | 350 | 1 |
| 4 | 160 | 553 | 1 | 480 | 1 |
| 5 | 130 | 627 | 1 | 520 | 1 |
| 6 | 160 | 1489 | 1 | 1320 | 1 |
| 7 | 400 | | 3 | 870 | 2 |
| 8 | 300 | 570 | 1 | 430 | 1 |

The numbering refers to the examples of the Finnish patent FI 112869. The clogging indicator and the quality in the third and fourth columns were the same as the previous results obtained by the single-step dissolution. The results of the novel two-step dissolving technique are given in the two columns on the right-hand side (Kw* and Quality*).

It can be seen that with the novel dissolving technique, not only is the dissolution time very short but also the quality class of the solution is clearly better than with the technique of prior art.

The invention is not limited to the above-presented embodiments, but it can be modified within the scope of the appended claims.

The invention claimed is:

1. A method for preparing a cellulose carbamate solution, the method comprising:
    dissolving cellulose carbamate in alkaline aqueous solution in two steps with solutions of different NaOH concentrations, a first step comprising admixing the cellulose carbamate into a cooled dilute NaOH solution having a NaOH concentration of 4% at the most in a premixing step to form a homogeneous mass, and, after the first step, a second step comprising dosing a remainder of the NaOH in a NaOH concentration of about 15 to 22%, at a temperature lower than that of the first step, below −15° C., under stirring, to accelerate the dissolution process and to obtain a fiberless solution.

2. The method according to claim 1, wherein in the first step, the mixing is performed at a temperature between T(m) and T(m)+2° C. wherein T(m) is the freezing point corresponding to the concentration of the cooled dilute NaOH solution.

3. The method according to claim 1, wherein a total NaOH content in the dissolution liquid after the two steps is 7 to 9%.

4. The method according to claim 1, wherein the cellulose carbamate is dissolved at maximum in an amount that depends on a degree of polymerization level in such a way that a cellulose carbamate content will be, at the most, 15% when the degree of polymerization level has been dropped below 150, and 6 to 10% when the degree of polymerization level is in the advantageous range from 200 to 400.

5. The method according to claim 4, wherein the dissolving is performed in the range from 200 to 400 depending on the degree of polymerization level so that the cellulose carbamate content increases when the degree of polymerization level decreases.

6. The method according to claim 5, characterized in that the cellulose carbamate content is adjusted as follows, depending on the degree of polymerization level:
    when the degree of polymerization is from 200 to 250, the cellulose carbamate content is from 9 to 11%,
    when the degree of polymerization is from 250 to 300, the cellulose carbamate content is from 8 to 10%,
    when the degree of polymerization is from 300 to 350, the cellulose carbamate content is from 7 to 9%,
    when the degree of polymerization is above 350, the cellulose carbamate content is below 8%.

7. The method according to claim 1, wherein the NaOH is first dosed at a concentration of about 1% and at a temperature of about 0° C.

8. The method according to claim 1, wherein the NaOH is dosed in the second step at a concentration of about 18% and at a temperature of about −20° C.

9. The method according to claim 1, wherein in the second step, the dissolution to the ready-to-use solution takes 1 to 5 minutes.

10. The method according to claim 1, wherein at least in the second step, the mixture of cellulose carbamate and liquid is cooled down.

11. The method according to claim 10, wherein a dissolving vessel to be used for dissolving the cellulose carbamate comprises a coolable jacket, for cooling down the mixture.

12. The method according to claim 1, wherein the cellulose carbamate is in the form of cellulose carbamate powder or granulates.

13. The method according to claim 1, wherein the NaOH solution has an alkali concentration of 1 to 2%.

14. The method according to claim 1, wherein the remainder of the NaOH is dosed in a concentration of about 17 to 20%, and at a temperature of from −25° C. to −15° C.

15. The method according to claim 1, wherein in the first step, the mixing is performed at a temperature below 5° C.

16. The method according to claim 5, characterized in that the cellulose carbamate content is adjusted as follows, depending on the degree of polymerization level:
    when the degree of polymerization is from 200 to 250, the cellulose carbamate content is from 9.5 to 10.5%, when the degree of polymerization is from 250 to 300, the cellulose carbamate content is from 8.5 to 9.5%,
when the degree of polymerization is from 300 to 350, the cellulose carbamate content is from 7.5 to 8.5%,
when the degree of polymerization is above 350, the cellulose carbamate content is 7.5% at the most.

* * * * *